(12) United States Patent
Christie et al.

(10) Patent No.: US 6,351,801 B1
(45) Date of Patent: *Feb. 26, 2002

(54) PROGRAM COUNTER UPDATE MECHANISM

(75) Inventors: David S. Christie; Scott A. White; Michael D. Goddard, all of Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/483,493

(22) Filed: Jan. 14, 2000

Related U.S. Application Data

(63) Continuation of application No. 09/037,436, filed on Mar. 10, 1998, now Pat. No. 6,035,386, which is a continuation-in-part of application No. 08/716,764, filed on Sep. 23, 1996, now Pat. No. 5,799,162, which is a continuation of application No. 08/252,030, filed on Jun. 1, 1994, now Pat. No. 5,559,975.

(51) Int. Cl.[7] .................................................. G06F 9/26

(52) U.S. Cl. ...................................... 712/205; 712/230

(58) Field of Search ................................. 712/205, 230

(56) References Cited

U.S. PATENT DOCUMENTS

| 3,781,808 A | 12/1973 | Ahearn et al. | 340/172.5 |
|---|---|---|---|
| 3,875,391 A | 4/1975 | Shaprio et al. | 364/736.05 |
| 4,044,338 A | 8/1977 | Wolf | 365/49 |

(List continued on next page.)

FOREIGN PATENT DOCUMENTS

| EP | 0 180 005 | 5/1986 | |
|---|---|---|---|
| EP | 0259095 A2 | 3/1988 | |
| EP | 0 363 222 | 4/1990 | |
| EP | 0380854 A3 | 8/1990 | |
| EP | 0381471 A2 | 8/1990 | |
| EP | 0454984 A2 | 11/1991 | |
| EP | 0454985 A2 | 11/1991 | |
| GB | 2281422 | 3/1995 | .......... G06F/09/38 |
| WO | 93/01546 | 1/1993 | |
| WO | 93 20505 | 10/1993 | |
| WO | 93 20507 | 10/1993 | |
| WO | 93/20507 | 10/1993 | |

OTHER PUBLICATIONS

IBM Technical Disclosure Bulletin, vol. 32, No. 5A, Oct., 1989, pp. 33–36, XP 000048827, "Roll–Back Interrupt Method for Out–Of–Order Execution of System Programs".

Toyohiko Yoshida, et al., "The Approach to Multiple Instruction Execution in the GMICRO/400 Processor", IEEE,©1991, pp. 185–195.

Brian Case, "AMD Unveils First Superscalar 26K Core", *Microprocessor Report*, Oct. 24, 1994, pp. 23–26.

Michael Slater, "AMD's K5 Designed to Outrun Pentium", *Microprocessor Report*, Oct. 24, 1994, pp. 1, 6–11.

Gurindar S. Sohi, "Instruction Issue Logic for High–Performance, Interruptible, Multiple Functional Unit, Pipelined Computers", IEEE Transactions on Computers, vol. 39, No. 3,©1990, pp. 349–359.

Tom R. Halfhill, "AMD K6 Takes on Intel P6", BYTE magazine, Jan. 1996, pp. 67–68, 70 and 72.

(List continued on next page.)

*Primary Examiner*—David Y. Eng
(74) *Attorney, Agent, or Firm*—Skjerven Morrill MacPherson, LLP; Stephen A. Terrile

(57) ABSTRACT

In a microprocessor system, a program counter circuit generates a program counter value that represents a retrieved instruction and that includes a more significant portion, a less significant portion, and a carry signal for use in determining a next program counter value. An execute program counter circuit generates an execute program counter value from the less significant program counter value and from the carry signal. The execute program counter value represents a program counter value of an executed instruction.

4 Claims, 13 Drawing Sheets

U.S. PATENT DOCUMENTS

| | | | |
|---|---|---|---|
| 4,155,119 A | 5/1979 | Ward | 395/400 |
| 4,179,737 A | 12/1979 | Kim | 395/375 |
| 4,200,912 A | 4/1980 | Harrington et al. | 395/742 |
| 4,384,343 A | 5/1983 | Morganti | 395/800 |
| 4,453,212 A | 6/1984 | Gaither | 395/400 |
| 4,727,481 A | 2/1988 | Auguille | 395/775 |
| 4,736,288 A | 4/1988 | Shintani et al. | 364/200 |
| 4,807,115 A | 2/1989 | Torng | 364/200 |
| 4,853,889 A | 8/1989 | Ditzel et al. | 395/584 |
| 5,056,006 A | 10/1991 | Acharya et al. | 395/425 |
| 5,131,086 A | 7/1992 | Circello et al. | 395/375 |
| 5,133,062 A | 7/1992 | Joshi et al. | 395/500 |
| 5,136,697 A | 8/1992 | Johnson | 395/375 |
| 5,155,816 A | 10/1992 | Kohn | 395/375 |
| 5,155,820 A | 10/1992 | Gibson | 395/375 |
| 5,185,871 A | 2/1993 | Frey et al. | 395/375 |
| 5,226,126 A | 7/1993 | McFarland et al. | 395/375 |
| 5,226,130 A | 7/1993 | Favor et al. | 395/375 |
| 5,261,063 A | 11/1993 | Kohn | 395/375 |
| 5,274,790 A | 12/1993 | Suzuki | 395/425 |
| 5,325,499 A | 6/1994 | Kummer et al. | 395/375 |
| 5,367,650 A | 11/1994 | Sharangpani et al. | 395/375 |
| 5,390,355 A | 2/1995 | Horst | 395/800 |
| 5,404,470 A | 4/1995 | Miyake | 395/375 |
| 5,450,560 A | 9/1995 | Bridges et al. | 395/410 |
| 5,454,117 A | 9/1995 | Puziol et al. | 395/800 |
| 5,465,373 A | 11/1995 | Kahle et al. | 395/800 |
| 5,467,473 A | 11/1995 | Kahle et al. | 395/800 |
| 5,471,593 A | 11/1995 | Branigin | 395/375 |
| 5,546,551 A | 8/1996 | Kohn | 395/375 |
| 5,568,624 A | 10/1996 | Sites et al. | 395/375 |
| 5,574,928 A | 11/1996 | White et al. | 395/800 |
| 5,651,125 A | 7/1997 | Witt et al. | 395/394 |

OTHER PUBLICATIONS

IEEE Computer Society Press, "1988 IEEE International Conference on Computer Design: VLSI in Computers & Processors," pp. 96–101.

IEEE Micro No. 4, "Implementing Precise Interruptions in Pipelined RISC Processors," Los Alamitos, CA, 1993, pp. 36–43.

IEEE Micro No. 3, "Architecture of the Pentium Microprocessor," Los Alamitos, CA, 1993, pp. 11–21.

IEEE Transactions on Computers, No. 5, "Implementing Precise Interrupts in Pipelined Processors," New York, NY, 1988, pp. 562–573.

IEEE Computer Society, The 11th Annual International Symposium on Computer Architecture, "Instruction Issue Logic For Pipelined Supercomputers," Ann Arbor, Michigan, 1984, pp. 110–118.

IEEE Computer Society, The 14th Annual International Symposium on Computer Architecture, "WISQ: A Restartable Architecture Using Queues," Pittsburgh, PA, 1987, pp. 290–299.

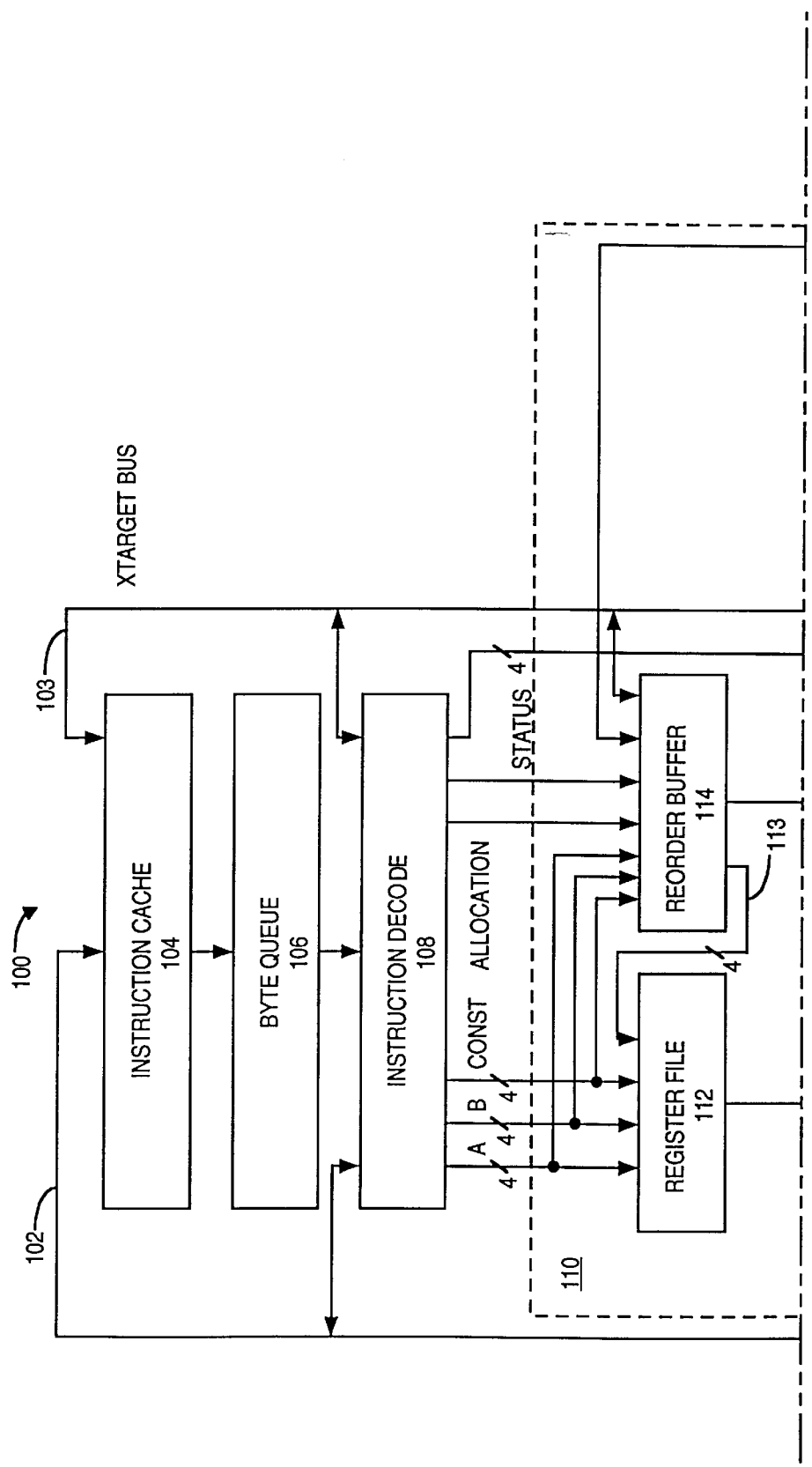

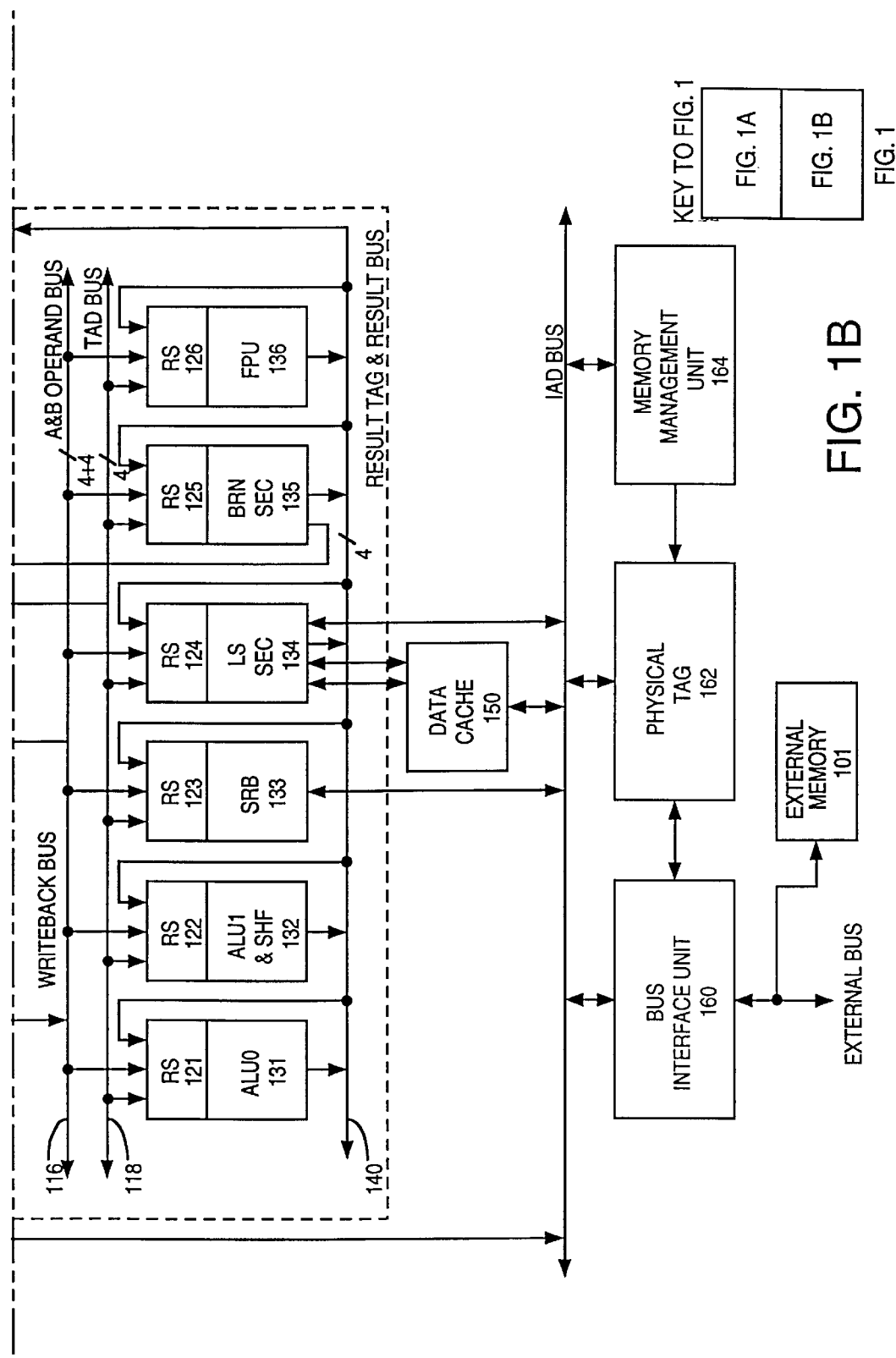

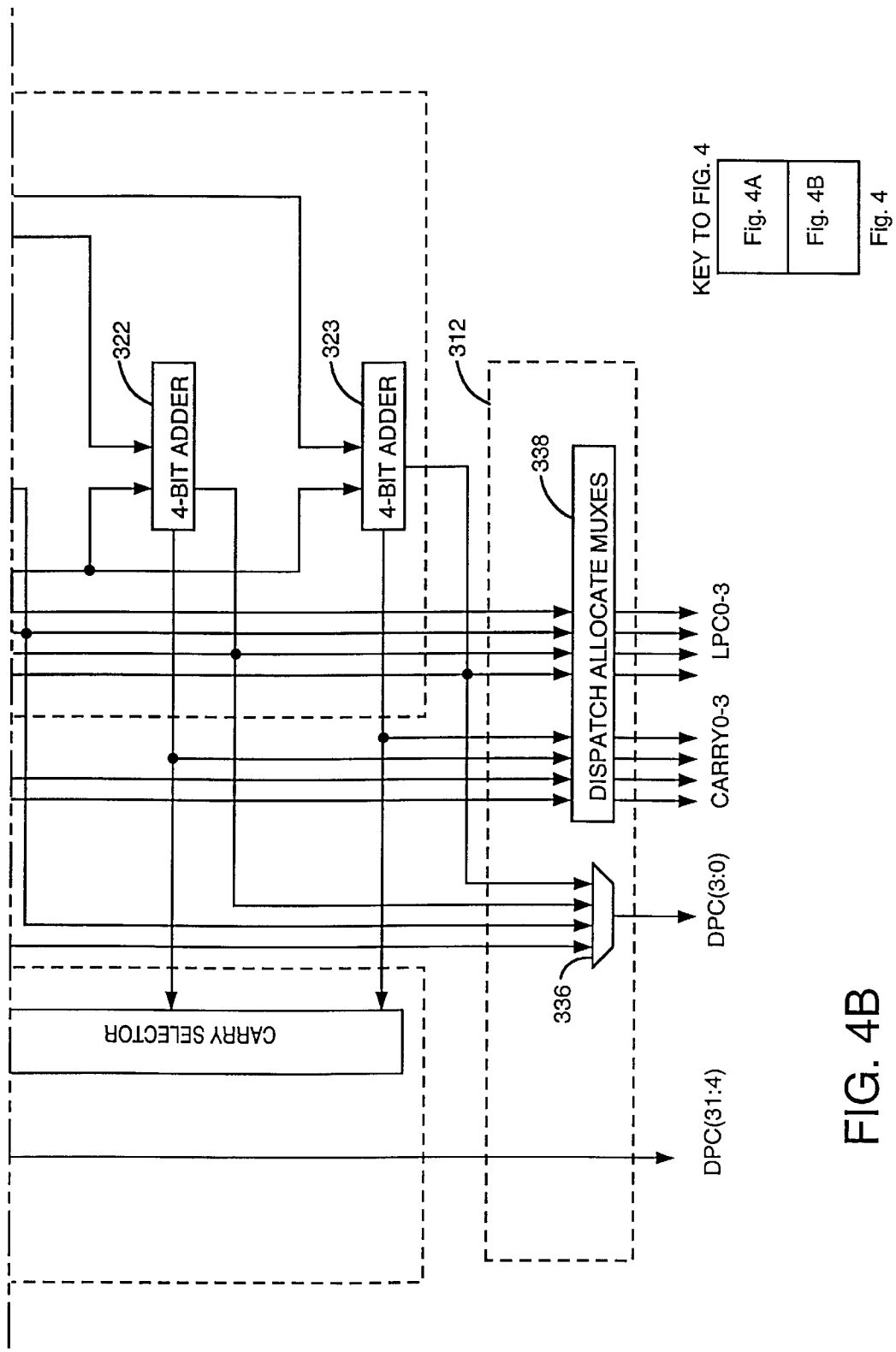

| RESULT 0 | P0 | LPC0 | FPOP 0 | FPFR 0 | CS 0 |
|---|---|---|---|---|---|
| RESULT 1 | P1 | LPC1 | FPOP 1 | FPFR 1 | CS 1 |
| RESULT 2 | P2 | LPC2 | FPOP 2 | FPFR 2 | CS 2 |
| RESULT 3 | P3 | LPC3 | FPOP 3 | FPFR 3 | CS 3 |
| RESULT 4 | P4 | LPC4 | FPOP 4 | FPFR 4 | CS 4 |
| RESULT 5 | P5 | LPC5 | FPOP 5 | FPFR 5 | CS 5 |
| RESULT 6 | P6 | LPC6 | FPOP 6 | FPFR 6 | CS 6 |
| RESULT 7 | P7 | LPC7 | FPOP 7 | FPFR 7 | CS 7 |
| RESULT 8 | P8 | LPC8 | FPOP 8 | FPFR 8 | CS 8 |
| RESULT 9 | P9 | LPC9 | FPOP 9 | FPFR 9 | CS 9 |
| RESULT 10 | P10 | LPC10 | FPOP 10 | FPFR 10 | CS 10 |
| RESULT 11 | P11 | LPC11 | FPOP 11 | FPFR 11 | CS 11 |
| RESULT 12 | P12 | LPC12 | FPOP 12 | FPFR 12 | CS 12 |
| RESULT 13 | P13 | LPC13 | FPOP 13 | FPFR 13 | CS 13 |
| RESULT 14 | P14 | LPC14 | FPOP 14 | FPFR 14 | CS 14 |
| RESULT 15 | P15 | LPC15 | FPOP 15 | FPFR 15 | CS 15 |

FIG. 6

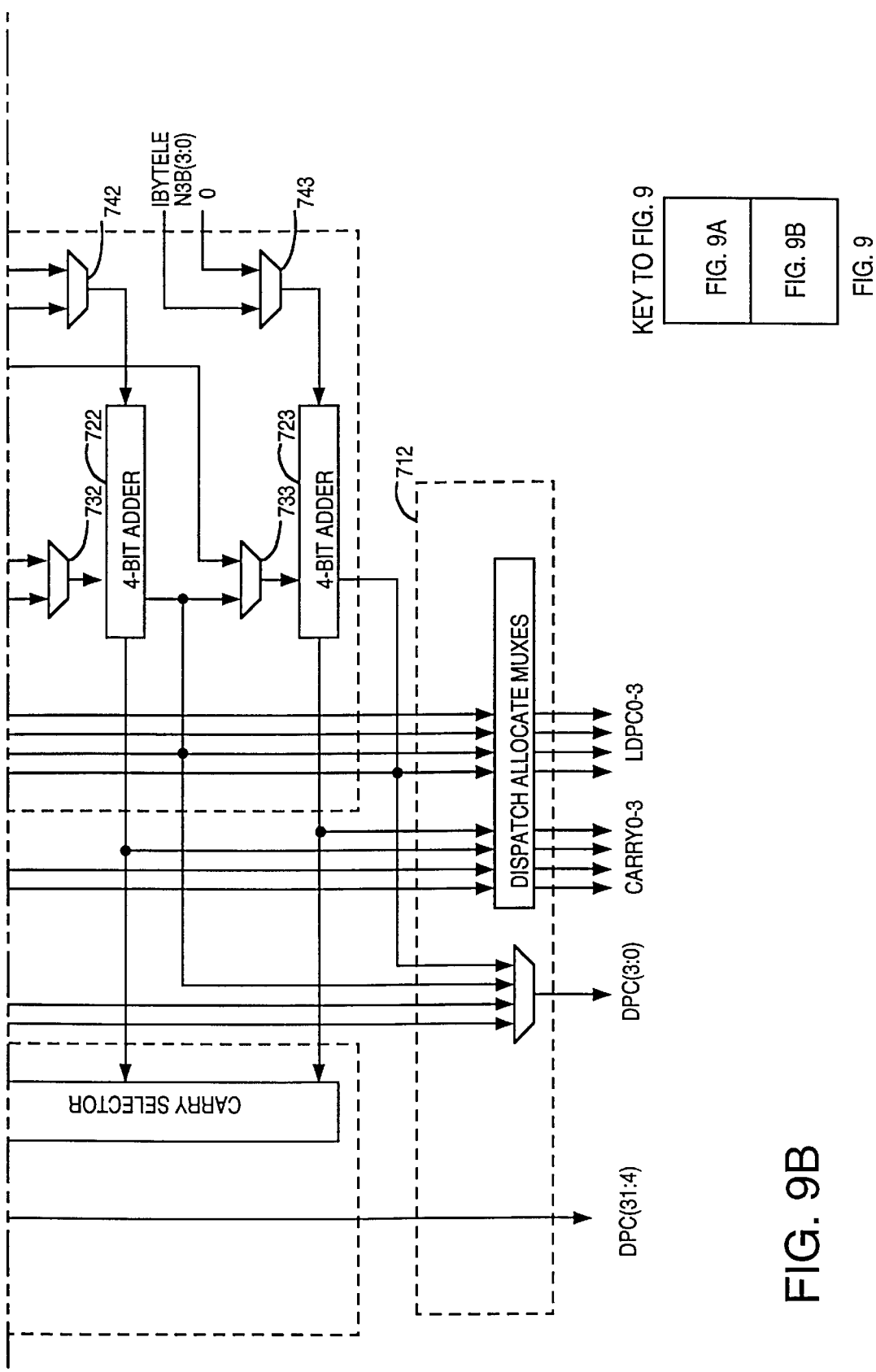

PROGRAM COUNTER UPDATE MECHANISM

This application is a continuation of application Ser. No. 09/037,436, filed Mar. 10, 1998 now U.S. Pat. No. 6,035,386, which is a continuation of application Ser. No. 08/716,764, filed Sep. 23, 1996 now U.S. Pat. No. 5,799,162, which is a continuation of application Ser. No. 08/252,030, filed Jun. 1, 1994, now U.S. Pat. No. 5,559,975, which applications are incorporated herein by reference.

BACKGROUND OF THE INVENTION

The present invention relates to microprocessors and more particularly to a mechanism for updating a program counter value of a microprocessor.

Microprocessors are processors which are implemented on one or a very small number of semiconductor chips. Semiconductor chip technology is ever increasing the circuit densities and speeds within microprocessors; however, the interconnection between the microprocessor and external memory is constrained by packaging technology. Though on-chip interconnections are extremely cheap, off-chip connections are very expensive. Any technique intended to improve microprocessor performance must take advantage of increasing circuit densities and speeds while remaining within the constraints of packaging technology and the physical separation between the processor and its external memory. While increasing circuit densities provide a path to evermore complex designs, the operation of the microprocessor must remain simple and clear for users to understand how to use the microprocessor.

While the majority of existing microprocessors are targeted toward scalar computation, superscalar microprocessors are the next logical step in the evolution of microprocessors. The term superscalar describes a computer implementation that improves performance by a concurrent execution of scalar instructions. Scalar instruction are the type of instructions typically found in general purpose microprocessors. Using today's semiconductor processing technology, a single processor chip can incorporate high performance techniques that were once applicable only to large-scale scientific processors. However, many of the techniques applied to large scale processors are either inappropriate for scalar computation or too expensive to be applied to microprocessors.

A microprocessor runs application programs. An application program comprises a group of instructions. In running the application program, the processor fetches and executes the instructions in some sequence. There are several steps involved in executing even a single instruction, including fetching the instruction, decoding it, assembling its operands, performing the operations specified by the instruction, and writing the results of the instruction to storage. The execution of instructions is controlled by a periodic clock signal. The period of the clock signal is the processor cycle time.

The time taken by a processor to complete a program is determined by three factors: the number of instructions required to execute the program; the average number of processor cycles required to execute an instruction; and, the processor cycle time. Processor performance is improved by reducing the time taken by the processor to complete the program, which dictates reducing one or more of these factors.

One way to improve performance of the microprocessor is by overlapping the steps of different instructions, using a technique called pipelining. To pipeline instructions, the various steps of instruction execution are performed by independent units called pipeline stages. Pipeline stages are separated by clocked registers. The steps of different instructions are executed independently in different pipeline stages. Pipelining reduces the effective number of cycles required to execute an instruction, though not the total amount of time required to execute an instruction, by overlapping instructions and thus permitting the processor to handle more than one instruction at a time. This is done without increasing and often decreasing the processor cycle time. Pipelining typically reduces the average number of cycles per instruction by as much as a factor of three. However, when executing a branch instruction, the pipeline may sometimes stall until the result of the branch operation is known and the correct instruction is fetched for execution. This delay is known as the branch-delay penalty. Increasing the number of pipeline stages also typically increases the branch-delay penalty relative to the average number of cycles per instruction.

A typical microprocessor executes one instruction on every processor cycle. A superscalar processor reduces the average number of cycles per instruction beyond what is possible in a pipelined scalar processor by allowing concurrent execution of instructions in the same pipeline stage as well as concurrent execution of instructions in different pipeline stages. The term superscalar emphasizes multiple concurrent operations on scalar quantities as distinguished from multiple concurrent operations on vectors or arrays as is common in scientific computing.

While superscalar processors are conceptually simple, there is more to achieving increased performance than widening a processor's pipeline. Widening the pipeline makes it possible to execute more than one instruction per cycle but there is no guarantee that any given sequence of instructions can take advantage of this capability. Instructions are not independent of one another but are interrelated; these interrelationships prevent some instructions from occupying the same pipeline stage. Furthermore, the processor's mechanisms for decoding and executing instructions can make a big difference in its ability to discover instructions that can be executed simultaneously.

Superscalar techniques largely concern the processor organization independent of the instruction set and other architectural features. Thus, one of the attractions of superscalar techniques is the possibility of developing a processor that is code compatible with an existing architecture. Many superscalar techniques apply equally well to either reduced instruction set computer (RISC) or complex instruction set computer (CISC) architectures. However, because of the regularity of many of the RISC architectures, superscalar techniques have initially been applied to RISC processor designs.

The Program counter (PC), also called an Instruction Pointer (IP), preserves the memory address of instructions as the instructions are fetched from memory and executed. The program counter mechanism for maintaining and updating the program counter value, which is referred to as the program counter, includes an incrementor, a selector and a register. As each instruction is fetched and decoded, the address of the next sequential instruction is formed by adding the byte length of the current instruction to the current value of the program counter using the incrementer and placing this next sequential instruction in the register. When a branch is taken, the address of the target instruction is selected by the selector instead of the incremented value and this target address is placed in the register.

The program counter value serves two purposes. The program counter value provides the memory address of the next instruction to be fetched and executed. The program counter value also identifies the address of an instruction that encountered a problem which halted the execution of the instruction stream. This address may be used for debugging purposes or for possible continuation of execution of the instruction stream after corrective action is taken.

When using a pipelining implementation in a microprocessor, the program counter value is maintained at the beginning of the pipeline where the value provides the instruction fetch address; this value is referred to as the fetch PC value. This fetch PC value points to instructions entering the pipeline. As instructions propagate along the pipeline stages, subsequent instructions are fetched and placed in the pipeline. Accordingly, the fetch PC value does not correspond to instructions which are in stages of the pipeline other than the first stage. Because most problems that step the execution of an instruction stream tend to be detected near or at the end of the pipeline, rather than at the beginning, the program counter value for an instruction must be maintained during execution of the instruction; this value is referred to as the execute PC value.

Two methods are known for maintaining the execute PC value. A first method is for the PC value of an instruction to accompany the instruction down the pipeline. With this method each pipeline stage requires additional storage to store the execution PC value. The amount of additional storage required is proportional to the number of pipeline stages. A second method duplicates the PC circuit at the end of the pipeline. In this method, only the length information of the instruction accompanies the instruction in the pipeline. As non-branch instructions complete, the length value of the instruction is added to the execute PC value to provide the execute PC value for the next instruction. As branch instructions complete, the target address for the branch, rather than the incremented value, is provided as the execute PC value.

SUMMARY OF THE INVENTION

It has been discovered that by providing a fetch program counter circuit which provides less significant program counter value bits separately and an execute program counter circuit which generates an execute program counter value using the less significant program counter value bits, it is possible to quickly and efficiently generate execute program counter values. It has also been discovered that by providing an execute program counter circuit which receives a plurality of less significant program counter bit values and selects a single less significant program counter bit value, it is possible to easily generate execute program counter values in a multiple pipeline processor.

BRIEF DESCRIPTION OF THE DRAWINGS

FIGS. 1A and 1B are a block diagram of a microprocessor in accordance the present invention.

FIGS. 4A and 4B are a block diagram of an instruction decoder program counter circuit in accordance with the present invention.

FIG. 6 is a block diagram of a reorder buffer array in accordance with the present invention.

FIGS. 9A and 9B are a block diagram of an alternate fetch program counter circuit in accordance with the present invention.

DETAILED DESCRIPTION

Figure 2:
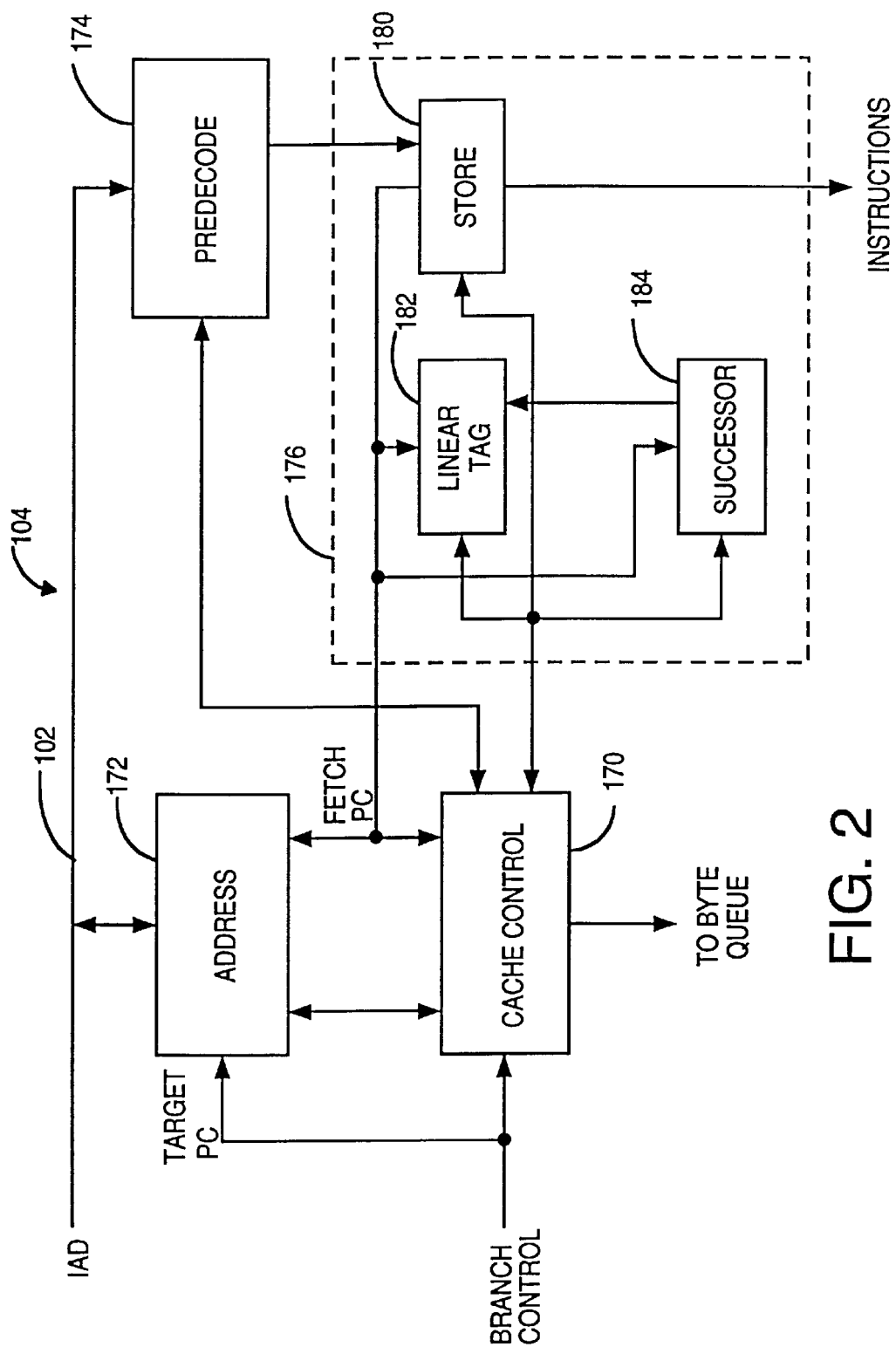
FIG. 2 is a block diagram of a linearly addressed instruction cache in accordance with the present invention.

The following sets forth a detailed description of the best contemplated mode for carrying out the invention. The description is intended to be illustrative of the invention and should not be taken to be limiting.

Referring to FIGS. 1A and 1B, the present invention can be best understood in the context of superscalar X86 microprocessor 100 which executes the X86 instruction set. Microprocessor 100 is coupled to physically addressed external memory 101 via a 486 XL bus or other conventional microprocessor bus. Microprocessor 100 includes instruction cache 104 which is coupled to byte queue 106 which is coupled to instruction decoder 108. Instruction decoder 108 is coupled to RISC core 110. RISC core 110 includes register file 112 and reorder buffer 114 as well as a variety of functional units such as, arithmetic logic units 131, 132 (ALU0 and ALU1 & SHF), special register block 133 (SRB), load/store unit 134 (LSSEC), branch section 135 (BRNSEC), and floating point unit 136 (FPU).

Risc core 110 includes A and B operand buses 116, type and dispatch (TAD) bus 118 and result bus 140 which are coupled to the functional units as well as displacement and instruction, load store (INLS) bus 119 (not shown) which is coupled between instruction decoder 108 and load/store unit 134. A and B operand buses 116 are also coupled to register file 112 and reorder buffer 114. TAD bus 118 is also coupled to instruction decoder 108. Result bus 140 is also coupled to reorder buffer 114. Additionally, branch section 135 is coupled to reorder buffer 114, instruction decoder 108 and instruction cache 104 via Xtarget bus 103. A and B operand buses 116 includes four parallel 41-bit wide A operand buses and four parallel 41-bit wide B operand buses as well as four parallel 12-bit wide A tag buses, four parallel 12-bit wide B tag buses, a 12-bit wide A tag valid bus a 12-bit wide B tag valid bus, four 4-bit wide destination tag buses and four 8-bit wide opcode buses. Type and dispatch bus 118 includes four 3-bit wide type code buses and one 4-bit wide dispatch buses. Displacement and INLS bus 119 includes two 32-bit wide displacement buses and two 8-bit wide INLS buses.

In addition to instruction cache 104, microprocessor 100 also includes data cache 150 (DCACHE) and physical tag circuit 162. Data cache 150 is coupled to Load/store functional unit 134 of the RISC core and with intraprocessor address and data (IAD) bus 102. Instruction cache 104 is also coupled with IAD bus 102. Physical tag circuit 162 interacts with both instruction cache 104 and data cache 150 via the IAD bus. Instruction cache 104 and data cache 150 are both linearly addressable caches. Instruction cache 104 and data cache 150 are physically separate, however, both caches are organized using the same architecture.

Microprocessor 100 also includes memory management unit (MMU) 164 and bus interface unit 160 (BIU). Memory management unit 164 is coupled with the IAD bus and physical TAG circuit 162. Bus interface unit 160 is coupled to physical TAG circuit 162, data cache 150 and IAD bus 102 as well as an external microprocessor bus such as the 486 XL bus.

Microprocessor 100 executes computer programs which include sequences of instructions. Computer programs are typically stored on a hard disk, floppy disk or other non-volatile storage media which are located in the computer system. When the program is run, the program is loaded from the storage media into main memory 101. Once the instructions of the program and associated data are in main memory 101, individual instructions are prepared for execution and ultimately executed by microprocessor 100.

After being stored in main memory 101, the instructions are passed via bus interface unit 160 to instruction cache 104, where the instructions are temporarily held. The X86 instructions are provided by instruction cache 104 via byte queue 106 to instruction decoder 108 using a fetch program counter value which is generated by instruction cache 104.

Instruction decoder 108 examines the instructions and determines the appropriate action to take. For example, decoder 108 may determine whether a particular instruction is a PUSH, POP, LOAD, STORE, AND, OR, EX OR, ADD, SUB, NOP, JUMP, JUMP on condition (BRANCH) or other instruction. Depending on which particular instruction that decoder 108 determines is present, the corresponding RISC operation (ROP) or RISC operations (ROPs) are dispatched to the appropriate functional unit of RISC core 110 and a Decoder PC value corresponding to each ROP or set of ROPs is generated. The decode PC value is generated asynchronously of the fetch PC value.

The instructions typically include multiple fields in the following format: OP CODE, OPERAND A, OPERAND B and DESTINATION. For example, the instruction ADD A, B, C means add the contents of register A to the contents of register B and place the result in register C. LOAD and STORE operations use a slightly different format. For example, the instruction LOAD A, B, C means place data retrieved from an address on the result bus, where A, B and C represent address components which are located on the A operand bus, the B operand bus and the displacement bus, these address components are combined to provide a logical address which is combined with a segment base to provide the linear address from which the data is retrieved. Also for example, the instruction STORE A, B, C means store data in a location pointed to by an address, where A is the store data located on the A operand bus and B and C represent address components which are located on the B operand bus and the displacement bus, these address components are combined to form a logical address which is combined with a segment base to provide the linear address to which the data is stored.

The OP CODEs are provided from instruction decoder 108 to the functional units of RISC core 110 via an opcode bus (not shown). Not only must the OP CODE for a particular instruction be provided to the appropriate functional unit, but also the designated OPERANDs for the instruction must be retrieved and sent to the functional unit. If the value of a particular operand has not yet been calculated, then that value must be first calculated and provided to the functional unit before the functional unit can execute the instruction. For example, if a current instruction is dependent on a prior instruction, the result of the prior instruction must be determined before the current instruction can be executed. This situation is referred to as a dependency.

The operands, which are needed for a particular instruction to be executed by a functional unit are provided by either register file 112 or reorder buffer 114 to the operand bus or forwarded from a functional unit via result bus 140. The operand bus conveys the operands to the appropriate functional units. Once a functional unit receives the OP CODE, OPERAND A, and OPERAND B, the functional unit executes the instruction and places the result on a result bus 140, which is coupled to the outputs of all of the functional units and to reorder buffer 114.

Reorder buffer 114 is managed as a first in first out (FIFO) device. When an instruction is decoded by instruction decoder 108, a corresponding entry is allocated in reorder buffer 114. The result value computed by the instruction is then written into the allocated entry when the execution of the instruction is completed. The result value is subsequently written into register file 112 and the instruction retired if there are no exceptions associated with the instruction and if no speculative branch is pending which affects the instruction. When the instruction is retired, its associated execute program counter value is also stored in a program counter register in register file 112. If the instruction is not complete when its associated entry reaches the head of the reorder buffer 114, the advancement of reorder buffer 114 is halted until the instruction is completed. Additional entries, however, can continue to be allocated.

Each functional unit includes respective reservation station circuits (RS) 121–126 for storing OP CODEs from instructions which are not yet complete because operands for that instruction are not yet available to the functional unit. Each reservation station circuit stores the instruction's OP CODE together with tags which reserve places for the missing operands that will arrive at the reservation station circuit later. This technique enhances performance by permitting microprocessor 100 to continue executing other instructions while the pending instruction is being assembled with its operands at the reservation station.

Microprocessor 100 affords out of order issue by isolating decoder 108 from the functional units of RISC core 110. More specifically, reorder buffer 114 and the reservation stations of the functional units effectively established a distributed instruction window. Accordingly, decoder 108 can continue to decode instructions even if the instructions can not be immediately executed. The instruction window acts as a pool of instructions from which the functional units draw as they continue to go forward and execute instructions. The instruction window thus provides microprocessor 100 with a lock ahead capability. When dependencies are cleared and as operands become available, more instructions in the window are executed by the functional units and the decoder continues to fill the window with yet more decoded instructions.

Microprocessor 100 uses branch section 135 of the RISC core to enhance its performance. Because when a branch occurs, the next instruction depends upon the result of the branch, branches in the instruction stream of a program hinder the capability of the microprocessor to fetch instructions. Branch section 135 determines whether branches should be taken. Additionally, instruction cache 104 includes a branch target buffer to keep a running history of the outcomes of prior branches. Based on this history, a decision is made during a particular fetched branch to determine which branch the fetched branch instruction will take. If there is an exception or branch misprediction based upon the determination of branch section 135, then the contents of reorder buffer 114 allocated subsequent to the mispredicted branch instruction are discarded.

FIG. 2 shows a block diagram of instruction cache 104. The application entitled "Pre-Decoded Instruction Cache and Method Therefor Particularly Suitable for Variable Byte-Length Instructions" having a Ser. No. 08/145,905 and a filing date of Oct. 29, 1993, now U.S. Pat. No. 5,689,672 is incorporated by reference and sets forth the structure and operation of instruction cache 104 in greater detail.

Instruction cache 104 is a linearly addressed 16 Kbyte 4-way set associative cache. Each set includes 256 entries; each entry includes a sixteen byte instruction block, a linear address tag and next predicted executed branch information. Instruction cache 104 includes cache controller 170, address circuit 172, predecode circuit 174 and cache array 176. Cache controller 170 provides control signals to orchestrate the various operations of instruction cache 104. Address circuit 172 generates a linear fetch program counter (FETCH PC) based upon a logical target program counter (TARGET PC) which is received from branch section 135 or a linear tag from linear tag array 182 and corresponding successor information from successor array 184; address circuit 172 also provides address generation and X86 protection checking associated with pre-fetching instructions from external memory. Address circuit 172 functions as a translation circuit for translating between logical addresses and linear addresses. Predecode circuit 174 receives pre-fetched x86 instruction byte via IAD bus 102, assigns predecode bits for each X86 instruction byte and writes the predecoded x86 instruction bytes into cache array 176. Cache array 176 stores instructions received from predecode circuit 174 and provides these instructions to byte queue 106 when addressed by the linear FETCH PC signal.

Cache array 176 is organized into three main arrays, instruction cache store array 180, linear tag array 182 and successor array 184. Instruction cache store array 180 stores the 16 byte instructions. Linear tag array 182 stores the linear address tags corresponding to the instructions. Successor array 184 stores predicted branch information, which is used to support branch prediction, corresponding to the instructions. Each of these arrays is addressed by the linear FETCH PC address which is provided by address circuit 172.

Figure 3:
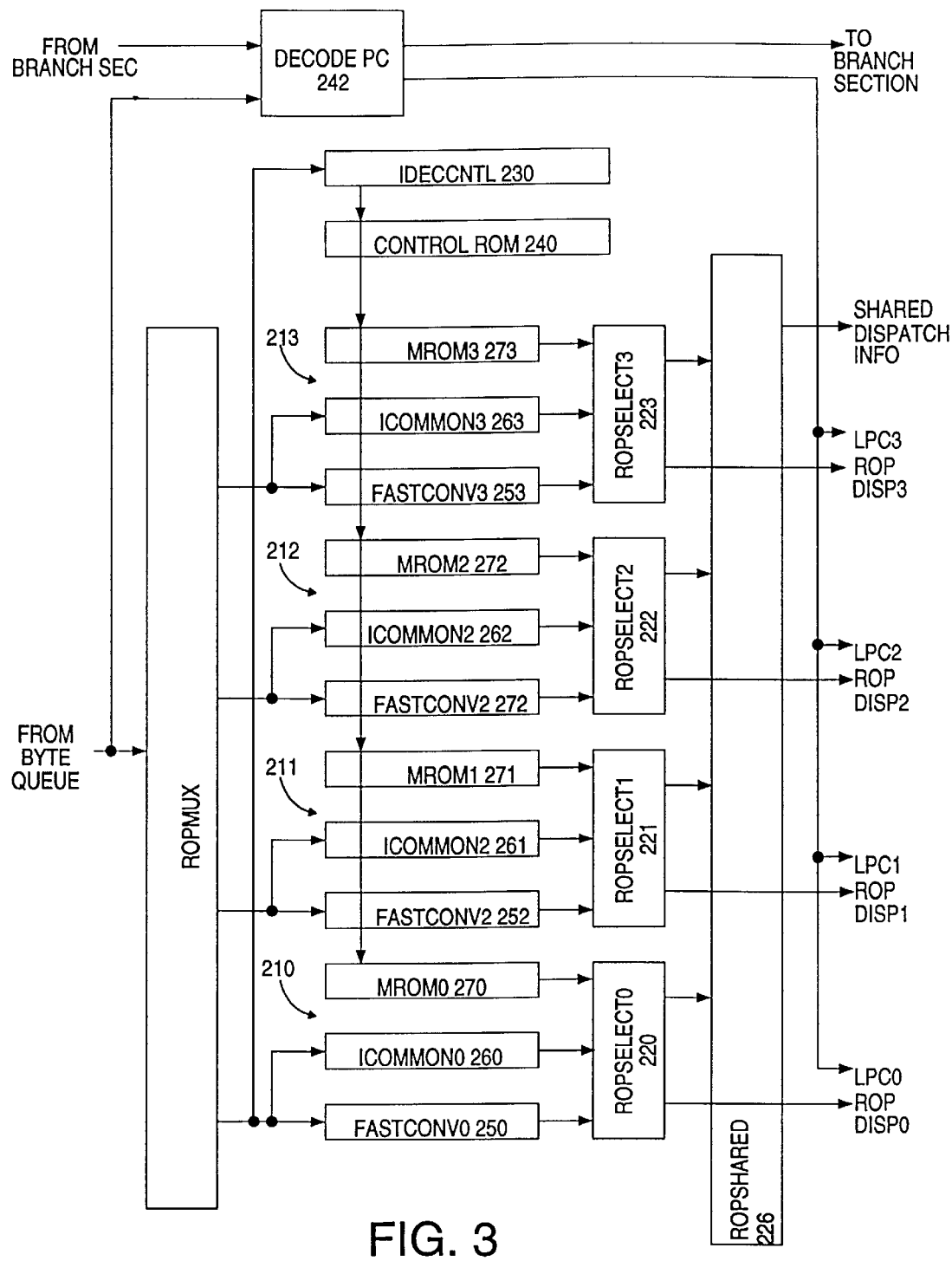
FIG. 3 is a block diagram of an instruction decoder in accordance with the present invention.

Referring to FIG. 3, instruction decoder 108 is a two-stage pipelined decoder which receives pre-decoded x86 instruction bytes from byte queue 106, translates then into respective sequences of ROPs, and rapidly dispatches ROPs from a plurality of dispatch positions. To maximize the opportunity for multiple instruction issue, the translation is handled in a hardwired fast conversion path for most simple instructions. In the preferred embodiment, the hardwired fast conversion path applies to x86 instructions which map to three ROPs or less. Instructions which require more than three ROPs and infrequently used instructions are handled by microcode sequences contained in microcode ROM. Whenever an x86 instruction maps to microcode ROM, the pre-decoded x86 instruction information is duplicated at multiple dispatch positions to allow each dispatch position to work independently and in parallel with other dispatch positions.

In the first decode stage, instruction decoder 108 determines whether ROPs for an x86 pre-decoded instruction are to be generated in the fastpath or the microcode ROM path. Information for ROP sequences either is generated by fast-pitch logic for up to four x86 instructions per cycle using up to four ROPs, or is read from microcode ROM for one pre-decoded x86 instruction. The information from the fast-path and the microcode ROM path which is required to generate an ROP includes the type of functional unit to which the ROP is designated to go, the specific simple RISC-like instruction to be executed at the functional unit, source and destination pointers for the ROP, size information of the ROP, addressing mode if a load or a store ROP, and immediate fields, if any, from the instruction for the ROP. Preferably, microcode ROM accesses are not mixed with fastpath decode functions, which avoids having to shift microcode ROPs. In the second decode stage, instruction decoder 108 selects and augments the ROP information from either the fastpath or the microcode ROM and furnishes complete ROPs which are executed in the functional units 131–136.

Instruction decoder 108 also controls shifting of byte queue 106, so that fully dispatched pre-decoded x86 instructions are shifted out of byte queue 106 and the next undispatched or partially dispatched pre-decoded x86 instruction is shifted to the "head of queue." Instruction decoder 108 also detects problems in byte queue 106 and indirectly redirects instruction cache 104 as appropriate by forcing a microcode entrypoint. Instruction decoder 108 also accepts microcode ROM entry points initiated by cache refill logic in instruction cache 104, and by exception and microbranch misprediction logic in branch section 135. Microcode entry points generated by branch section 135 are communicated to the instruction decoder 108 over XTARGET bus 103. Instruction decoder 108 also generates a decode program counter value corresponding to each ROP.

Instruction decoder 108 includes ROP multiplexer 200, four dispatch position circuits 210, 211, 212, 213, four ROP selector circuits 220, 221, 222, 223 and an ROP shared circuit 226 as well as instruction decode control circuit 230, ROM control 240 and decode program counter circuit 242. ROP multiplexer 200 (ROPMUX) directs entries of byte queue 106 to the four dispatch positions 210–213. Each dispatch position includes respective fast converters 250, 251, 252, 253 (FASTCONV0, FASTCONV1, FASTCONV2, and FASTCONV3, respectively), respective common stages 260, 261, 262, 263 (ICOMMON0, ICOMMON1, ICOMMON2, and ICOMMON3, respectively) and respective microcode ROMs 270, 271, 272, 273 (MROM0, MROM1, MROM2, and MROM3, respectively). Microcode ROMS 270–273 are controlled by microcode ROM instruction decode controller 240 (IDECCNTL). ROP multiplexer 200, dispatch position circuits 210–213, microcode ROM instruction decode controller 230 and decode program counter circuit 242 generally form the first stage of the instruction decoder 108. The second stage of the instruction decoder 108 generally is implemented in ROP selector circuits 220–223 (ROPSELECTO0, ROPSELECT1, ROPSELECT2, and ROPSELECT3, respectively) and in ROP shared circuit 226 (ROPSHARED).

Instruction decoder 108 is controlled by instruction decode controller 230. Instruction decode controller 230 contains logic implemented in combinatorial logic or programmable array logic for providing general control functions such as furnishing instruction type information on the TAD bus 118, predicting how many of the ROPs in the current dispatch window can be accepted by the RISC core 110, informing instruction cache 104 how to shift byte queue 106 in view of the prediction, informing the ROP multiplexer 200 of the number of ROPs yet to be dispatched for the pre-decoded x86 instruction at the head of byte queue 106, and accessing microcode and control ROM. To provide these functions, instruction decode controller 230 receives various information from the functional units 131–136 of the RISC code 110 as well as from other units of the processor 100.

Each fast converter 250, 251, 252, and 253 performs a fast conversion of many types of "simple" x86 instructions (i.e. those which map to 3 or fewer ROPs) into ROPs. The fast converter in each dispatch position converts the x86 instruction to a respective one of a sequence of ROPs (a sequence being one or more ROPs) needed to carry out the x86 instruction, and modifies the operation of the ROP for certain prefixes and SIB bytes. Fast converters 250–253 are implemented either as programmable array logic or as combinatorial logic latched early in phase one of the second decode stage.

Rarely used x86 instructions and x86 instructions requiring ROP sequences of more than 3 ROPs to execute are mapped to microcode ROM. Generally, the x86 instructions which map to more than three ROPs are complex interactive instructions such as the CALL gate instruction, the STRING move instruction, and the transcendental floating point routines. In that event, ROM controller 240 in the instruction decoder 108 forms a microcode ROM address known as an entrypoint, and based on the entrypoint, reads the ROP sequence from the microcode ROM instructions stored in the Microcode ROMs 270–273 at four ROPs per cycle. Each microcode ROM 270, 271, 272, and 273 is a 1024×59 ROM array for handling x86 instructions which are not convertible in a fast converter.

Dispatch positions 210, 211, 212 and 213 also include respective common stages 260, 261, 262, and 263. Each common stage functions as a pipeline stage. Each common stage 260, 261, 262, and 263 is associated with a respective fast converter and microcode ROM. Portions of x86 instruction conversion operations which can be effectively handled in a particular way regardless of whether the instruction is a fastpath or microcode ROM instruction, and which do not require generation in the microcode ROM are carried out and pipelined, along with common data not requiring conversion, through the respective common stage in step with the processing of instruction portions in the various stages the fast converter or microcode ROM. Each common stage also keeps track of register pointers which are used for performing internal instruction decoder address calculations used both by fastpath instructions and MROM instructions.

Each selector circuit 220, 221, 222, and 223 selects either the outputs of the fast converter and the pipeline stage or the outputs of the microcode ROM and the pipeline stage and generates dispatch information. Each selector circuit also selects the immediate field constant values to drive immediate address or constants to the functional units 131–136. ROP shared unit 226 is responsive to information from the ROP select circuit in each of the dispatch positions 210–213 for generating dispatch information for resources that are shared by all dispatch positions.

Decode program counter circuit 242 tracks the logical program counter value of each of the x86 instructions that is sent from byte queue 106. Byte queue 106, upon detecting a non-sequential fetch in the pre-fetch stream, indicates the byte of the target and the new target address to decode program counter circuit 242. Decode program counter circuit 242 then generates the decode program counter value which is provided to branch section 135 as well as low order bits and carry bits of the decode program counter value for each dispatched ROP. The LPC bits and the carry bits are provided to reorder buffer 114 by instruction decoder 108.

Because the ROP decode program counter value, which is maintained in a decode PC register in decode PC circuit 242 register, is maintained as a logical address in the x86 architecture, a conversion is necessary from the linear addresses used to access instruction cache 104 to the logical address required for updating the decode PC register when performing intersegment branches. This is accomplished in instruction cache 104 by first subtracting off the segment base pointer from the linear address to get the logical address. This 32-bit logical address is then driven to decode program counter circuit 242 of instruction decoder 108 which then generates the ROP decode program counter value. When not performing intersegment branches, the decode PC value is updated with decode program counter circuit 242.

For sequential instructions following branches, decode program counter circuit 242 counts the number of x86 bytes in the byte queue between start and end positions and adds this onto the beginning logical decode program counter value to generate the next decode program counter value.

Instruction decoder controller 230 is any suitable state machine for controlling the operation of the various units of the instruction decoder 108.

Figure 4A:
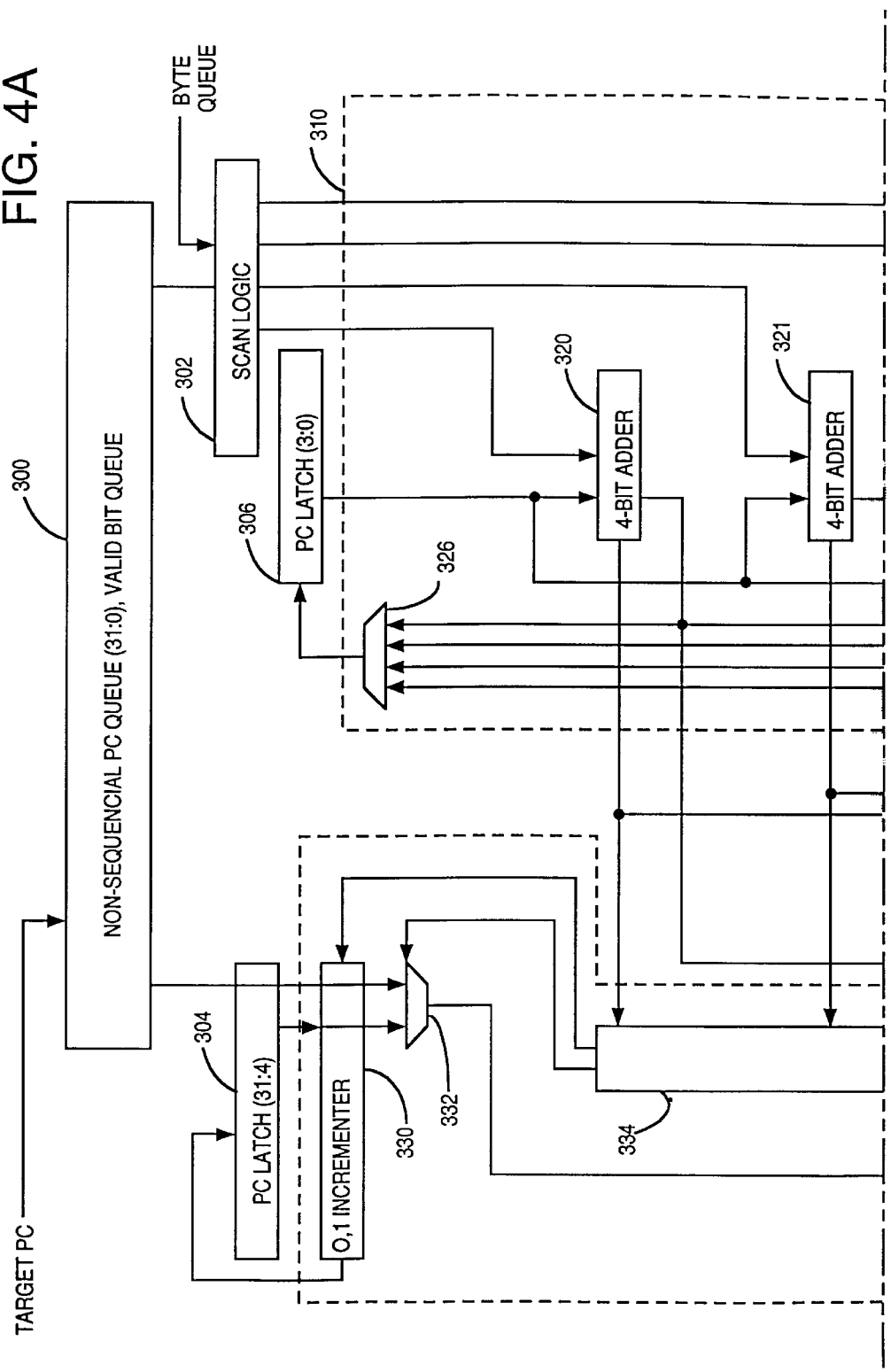

Referring to FIGS. 4A and 4B, decode program counter generator circuit 242 includes queue 300, scan logic 302, more significant portion program counter latch 304, less significant portion program counter latch 306, more significant portion program counter generator circuit 308, less significant portion program counter generator circuit 310, and program counter value selector circuit 312.

Queue 300 holds the 32-bit non-sequential program counter value as well as the valid bit value and provides bits 4:31 of the non-sequential program counter value to more significant portion program counter latch 304. Queue 300 provides bits 0:3 of the non-sequential program counter value to scan logic 302.

Scan logic 302 provides four 4-bit offset values corresponding to the four ROPs which are being processed by instruction decoder 108 to less significant program counter generator circuit 310. Each of the four offset values represents an offset between an x86 instruction stored within queue 106 and the present decode program counter value stored within queue 300. Each x86 instruction stored in queue 106 may map to more than one ROP. Because the four ROPs that are being processed by instruction decoder 108 in the same cycle may correspond to one X86 instruction, the four offset values may all have the same value. These offset values are generated by scan logic 302 selecting the start bit for the instruction at the head of queue 106 and the start bit for the next instruction within queue 106. The offset is cumulative for the four ROPs that are being processed by instruction decoder 108 in the same cycle, i.e., the offset is equal to the number of bytes between the first ROP and the ROP for which the offset is being generated, regardless of how many ROPs are in between the two ROPs.

Less significant program counter generator circuit 310 includes adders 320–323 and multiplexer 326. Each adder 320, 321, 322, 323 receives one of the 4-bit offset values. Adders 320–323 add these 4-bit offset values to bits 0:3 of the present decode program counter value from latch 306 to obtain the lower order bits, bits 0:3, of a potential next program counter value. Each potential next program counter value corresponds to an ROP to be dispatched. Bits 0:3 of the potential next program counter value are provided to multiplexer 326. Multiplexer 326 multiplexes these potential next program counter values to provide the next program counter value to decode program counter latch 306, based upon which instructions are removed from queue 300 as their corresponding ROPs are dispatched by instruction decoder 108. Latch 306 stores the multiplexed value as the present decode program counter value for use in obtaining the next decode program counter value Less significant program counter generator circuit 310 provides the carry bits from each adder to carry selector 334 of more significant program counter generator circuit 306. Less significant program counter generator circuit 310 also provides these carry bits to counter value selection circuit 312.

More significant program counter latch 304 provides bits 4:31 of the next program counter value to more significant program counter generator circuit 308. More significant program counter generator circuit includes address incrementer 330, multiplexer 332 and carry selector 334. Incrementer 330 receives the upper 28 bits of the present decode PC value and provides an incremented decode PC value, i.e., a value in which the upper 28 bits are incremented by one. This incremented decode PC value is provided to multiplexer 332 which also receives the present decode PC value. Multiplexer 332 provides one of these two values as the next decode PC value under the control of carry selector circuit 334. Carry selector circuit 334 uses the carry bits from lose significant portion program counter generator circuit 310 to determine which of the carry bits corresponds to the next ROP to be dispatched and uses the value of this carry bit to control multiplexer 332. If the carry bit of the next ROP to be dispatched is active, indicating a carry, then the incremented decode PC value is used for the upper 28 bits of the next decode PC value, otherwise, the upper 28 bits of the present decode PC value are used for the upper 28 bits of the next decode PC value.

Counter value selection circuit 312 includes multiplexer 336 and dispatch allocate multiplexers 338. Multiplexer 336 selects one of four potential lower order next program counter values as bits 0:3 of the decode program counter values (DPC) based upon which instructions are removed from queue 300 as their corresponding ROPs are dispatched by instruction decoder 108. Multiplexer 336 provides this decode program counter value to reorder buffer 114. Dispatch allocate multiplexers 338 receive the lower order next program counter values (LPC) and the carry values (CARRY) and provide these values to reorder buffer 114 for each ROP that is dispatched.

More significant program counter generator circuit 308 provides bits 4:31 of the decode program counter value to program counter value selection circuit 312. Program counter value selection circuit 312 combines these bits with the selected less significant bits 0:3 from multiplexer 336 to provide the complete, i.e., bits 0–31, decode program counter (PDC) value.

Referring to FIG. 3, reorder buffer 114 is a circular first in first out (FIFO) circuit which tracks the relative order of speculatively executed ROPs. Reorder buffer storage locations are dynamically allocated, using head and tail queue pointers, for sending retiring results to register file 112 and for receiving mismatched ROPs from instruction decoder 108, respectively. When an instruction is decoded, its result value is allocated a location, or destination, in reorder buffer 114 and its destination register number is associated with this location. For a subsequent instruction having no dependencies, the associated A and B operand buses are driven from register file 112. However, when a subsequent instruction has a dependency and refers to the renamed destination register to obtain the value considered to be stored therein, an entry is accessed within reorder buffer 114. If a result is available therein, it is placed on the operand bus. If the result is unavailable, a tag identifying this reorder buffer entry is furnished on a operand tag bus of the A and B operand tag buses 116. The result or tag is furnished to the functional units over the operand buses or operand tag buses. When results are obtained from completion of execution in the functional units, the results and their respective result tags are furnished to reorder buffer 114 as well as to the reservation stations of the functional units over the five bus wide result buses and five result tag buses 140.

Reorder buffer 114 uses a compact form of holding the program counter value which is associated with the ROP for updating the execute program counter register. This compact form requires only the 4 least significant bytes and a bit increment, i.e., carry, indication. For sequential x86 bytes, the number of bytes added can be no more than 15, and for non-sequential fetches, the successful completion of a branch drives the new branch target on the result bus, so writing new branch locations into reorder buffer 114 from instruction decoder 108 does not need to occur.

Reorder buffer 114 includes reorder buffer control and status circuit 400, reorder buffer array 402 and reorder buffer operand bus driver 404. Reorder buffer array 402 is a temporary storage memory that is controlled by reorder buffer control and status circuit 400. When instruction decoder 108 dispatches ROPs, instruction decoder 108 places a signal on one of the destination pointer (DEST REG) busses. Reorder buffer control and status circuit 400 then allocates an entry or reorder buffer array 402. Each entry of reorder buffer array 402 is allocated to provide a temporary destination register into which a result is written when the ROP is completed. The execute PC value, which is stored in an execute program counter register within reorder buffer and status circuit 400, is updated when the instruction is retired. Multiple reorder buffer entries can correspond to a single register in register file 112, thereby providing for temporary renaming of registers. Reorder buffer control and status circuit 400 determines when a completed ROP can be retired to register 112. When the instruction is retired, the execute program counter register is updated.

Reorder buffer control and status circuit 400 receives A and B operand pointers from instruction decoder 108. Reorder buffer control and status circuit 400 uses these pointers to interrogate entries in reorder buffer array 402 to determine whether an operand that is needed for execution of a dispatched ROP is contained in reorder buffer array 402.

Referring to FIG. 6, reorder buffer array 402 includes sixteen entries for temporarily storing forwarded operand results to be written back to the register file when the result is no longer part of the speculative state of the processor. Each of the sixteen reorder buffer entries includes a 41-bit result field (RESULT), a 9-bit destination pointer field (P), a 4-bit lower program counter value field (LPC) as well as an 11-bit floating point operation code field (FPOF), an 11-bit floating point flag register field (FPRF), and a 24-bit control and status field (CS).

The result field stores result data from the functional units. The 41-bit result field allows a floating point result to be stored in two reorder buffer entries; integer results are stored in 32 of the 41 bits.

The destination pointer field of each reorder buffer entry designates a destination register address in register file 122 for the result from the execution of an instruction to be written during write-back. Reorder buffer control and status circuit 400 receives the destination pointer from instruction decoder 108 via the destination register (DEST REG) busses and loads the pointer into the destination pointer field of reorder buffer array 402 to store it for when the ROP which is associated with the pointer is retired. When ROPs are dispatched, reorder buffer 114 performs dependency checking by scanning all destination pointer fields of reorder buffer array 402 to determine whether a match exists between a destination pointer and the A or B operands. A match indicates a data dependency.

The floating point operation code field is set to a subset of the bits of a floating pointer operation code allocated to a reorder buffer entry. The floating point flag register field stores the state of the floating point flags resulting from a floating point operation. Floating point flags store information relating to precision, underflow, overflow, zero divide, denormalized operand and invalid operand errors detected by floating point functional unit 136. For integer operands, a corresponding flag field is not necessary since flags resulting from integer operations are held in the upper order bits of the 41-bit result field.

The status and control field includes bits which denote the status of the ROP entry, for example, whether a reorder buffer entry is allocated, a branch is incorrectly predicted or performance of an instruction has caused an exception or error condition. The status and control field also includes bits which relate to generating the execute program counter value. More specifically, the status and control field includes the carry bit which is provided by the decode PC generator circuit for each ROP, an exit bit, which indicates, when set, that the ROP is the last ROP in the sequence of ROPs for a particular x86 instruction, and a complete (or valid) bit, which indicates that a result is valid, indicating that the instruction is complete. The exit bit indicates when to update the execute PC value stored within the execute program counter register. The execute program counter value is only updated when the ROP sequence for a particular x86 instruction completes.

Figure 5:
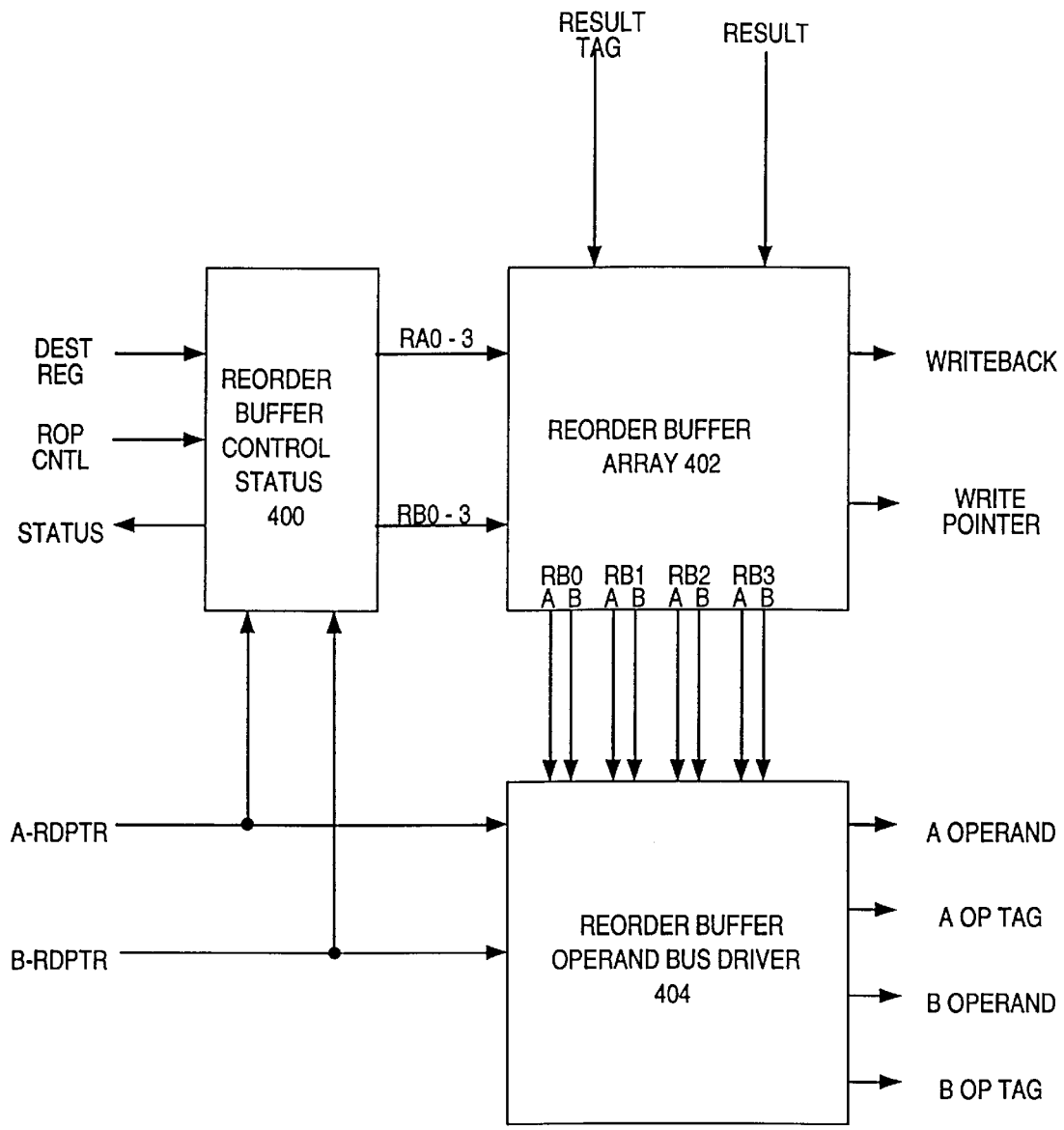
FIG. 5 is a block diagram of a reorder buffer in accordance with the present invention.

Referring again to FIG. 5, a functional unit that executes an ROP and generates a result directs that result to an appropriate reorder buffer entry using a destination tag. At dispatch a destination tag is set on one of the four destination tag buses which connect to the functional units. The functional unit places the result on one of the result busses 140 and the destination tag on the corresponding result tag and status bus. Reorder buffer control and status circuit 400 receives the result tag on from the result tag bus and uses this tag to address entries within reorder buffer array 402. The signal on the one of the result busses corresponding to one of the result tag and status busses is loaded into reorder buffer array entry designated by the result tag value.

Reorder buffer control and status circuit 400 also checks for data dependencies and, when unresolved dependencies occur, tags operands using A and B operand tag busses which are associated with the operand busses. The tag identifies the result upon which the dependency is based for use by the functional unit reservation stations. Reorder buffer 114 overrides a register file read when a data dependency is detected. When reorder buffer control and status circuit 400 detects a data dependency at the dispatch, it overrides the read operation of any dependent operand in an entry of reorder buffer array 402 by setting bits of the override bus that are applied to reorder buffer operand bus driver 104. The override bus includes override signals for each operand bus.

If reorder buffer 114 determines that source operand data are not dependent on unavailable data and are available from register file 112 or reorder buffer 114, the operand data are sent via operand busses 116 to the functional unit reservation stations. Data are addressed in reorder buffer 114 when the register address of the read pointer matches the destination pointer address of an entry. The read pointer of the A or B operand read pointers (A-RDPTR or B-RDPTR) addresses reorder buffer array 402 through the reorder buffer control and status circuit 400, to apply operand data to reorder buffer operand bus driver 404. Reorder buffer operand bus driver 404 drives operand data onto the A and B operand buses 116.

An ROP is retired as reorder buffer control and status circuit 400 writes the result from reorder buffer array 402 to register file 112, placing the result on one of the writeback busses and writing the destination pointer to the write pointer corresponding to the writeback bus. The write pointer designates the register address within register file 112 to receive the retired result. When the ROP is retired reorder buffer operand bus driver 404 generates an execute program counter value using the LPC field of reorder buffer array 402.

Reorder buffer status and control circuit 400 detects various conditions of reorder buffer 114 and relays condition signals to various circuits in processor 100 using a reorder condition bus. A signal of reorder condition bus is received by register film 112 for each of the four A and B operand and indicates when reorder buffer 114 is providing a forwarded operand for execution. Other signals on the reorder buffer condition bus, which reflect full, empty or single entry reorder buffer conditions, are received by instruction decoder 108.

Figure 7A:
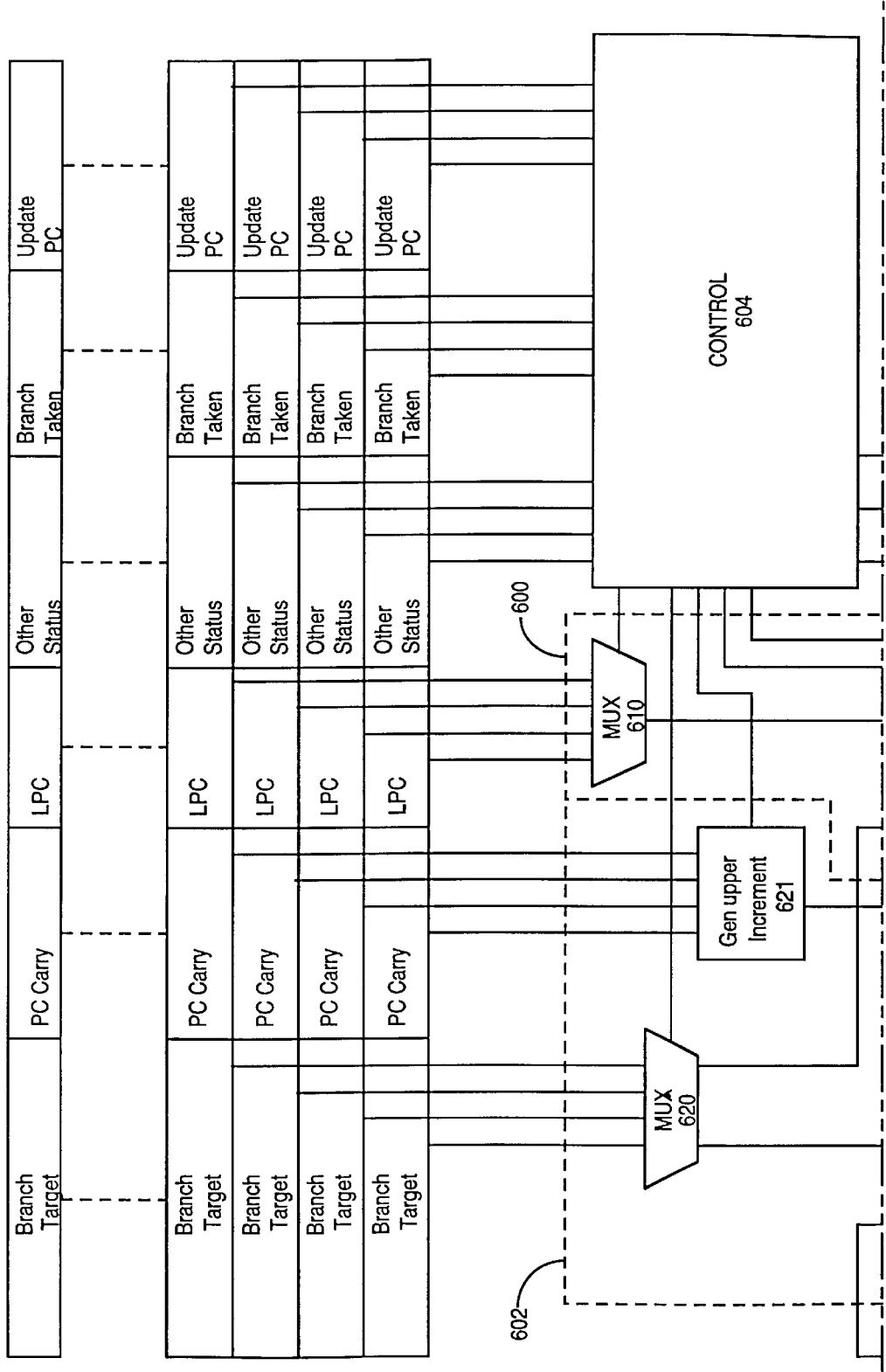
FIGS. 7A and 7B are a block diagram of a reorder buffer program counter circuit in accordance with the present invention.
Figure 7B:
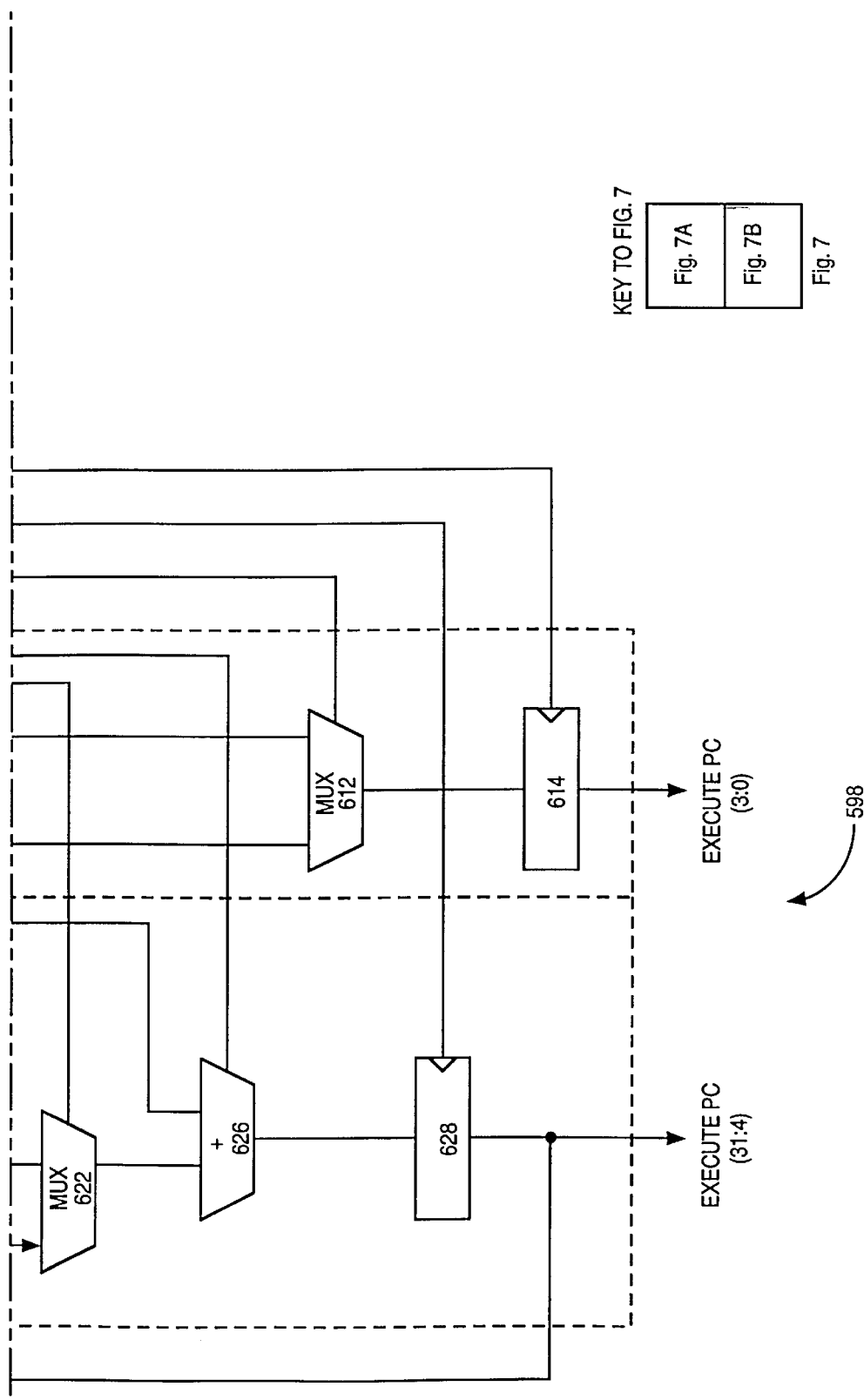

Referring to FIGS. 7A and 7B, execute program counter generator circuit 598, which is included within ROB control and status circuit 400, includes less significant program counter generator 600, more significant program counter generator 602 and execute program counter controller 604. Less significant program counter generator 600 includes entry multiplexer 610, branch multiplexer 612 and register 614. Entry multiplexer 610 receives the less significant 4-bit portions of the program counter values for the four instructions which are stored in four oldest reorder buffer entries 402. Entry multiplexer 610 provides one of these less significant program counter values to branch multiplexer 612 which also receives the less significant bits of a branch program counter value. Branch multiplexer 612 provides a 4-bit less significant execute program counter value to register 614, which provides this value as the next execute program counter value. Entry multiplexer 610, branch multiplexer 612 and register 614 are controlled by execute program counter control circuit 604.

More significant program counter generator 602 includes entry multiplexer 620, branch multiplexer 622, generate more significant increment circuit 624, adder circuit 626 and register 628. Entry multiplexer 620 receives branch target values from the four instructions which are stored in four least significant reorder buffer entries and provides one of these entries as the next branch target under control of execute program counter control circuit 604. The next branch target value includes a 28-bit more significant branch target value and a 4-bit lower branch target value. The more significant branch target value is provided to branch multiplexer 622; branch multiplexer 622 also receives the 28 bit more significant execute program counter value from register 628. Branch multiplexer 622 provides a multiplexed preliminary more significant execute program counter value to adder circuit 626 which also receives an increment signal from generate more significant increment circuit 621. Adder circuit 626 provides the more significant execute program counter value to register circuit 628 based upon this addition. Register control 628 provides a clocked more significant execute program counter value under control of control circuit 604.

Controller 604 receives control information from each of the four least significant reorder buffer entries. This control information includes a branch taken signal for each entry and an update program counter signal from each entry as well as a valid signal and an update execute program counter signal for each entry. Based upon this control information, execute program counter controller 604 controls the generation of the more significant and less significant execute program counter values. The branch taken signal indicates whether a branch is taken and is active when the branch was taken, thus indicating that the branch address should be used. The valid signal indicates that the result of the ROP is returned from the functional units, i.e., that there is a valid result, and is active when the branch result is returned. The update execute program counter value signal indicates when to update the execute program counter value and is active when the ROP is retired.

Because less significant program counter generator 600 uses a multiplexer to generate a new lower execute program counter value, it is possible to generate execute program counter values for larger pipelines merely by widening the multiplexer into which the less significant program counter values are provided.

Figure 8:
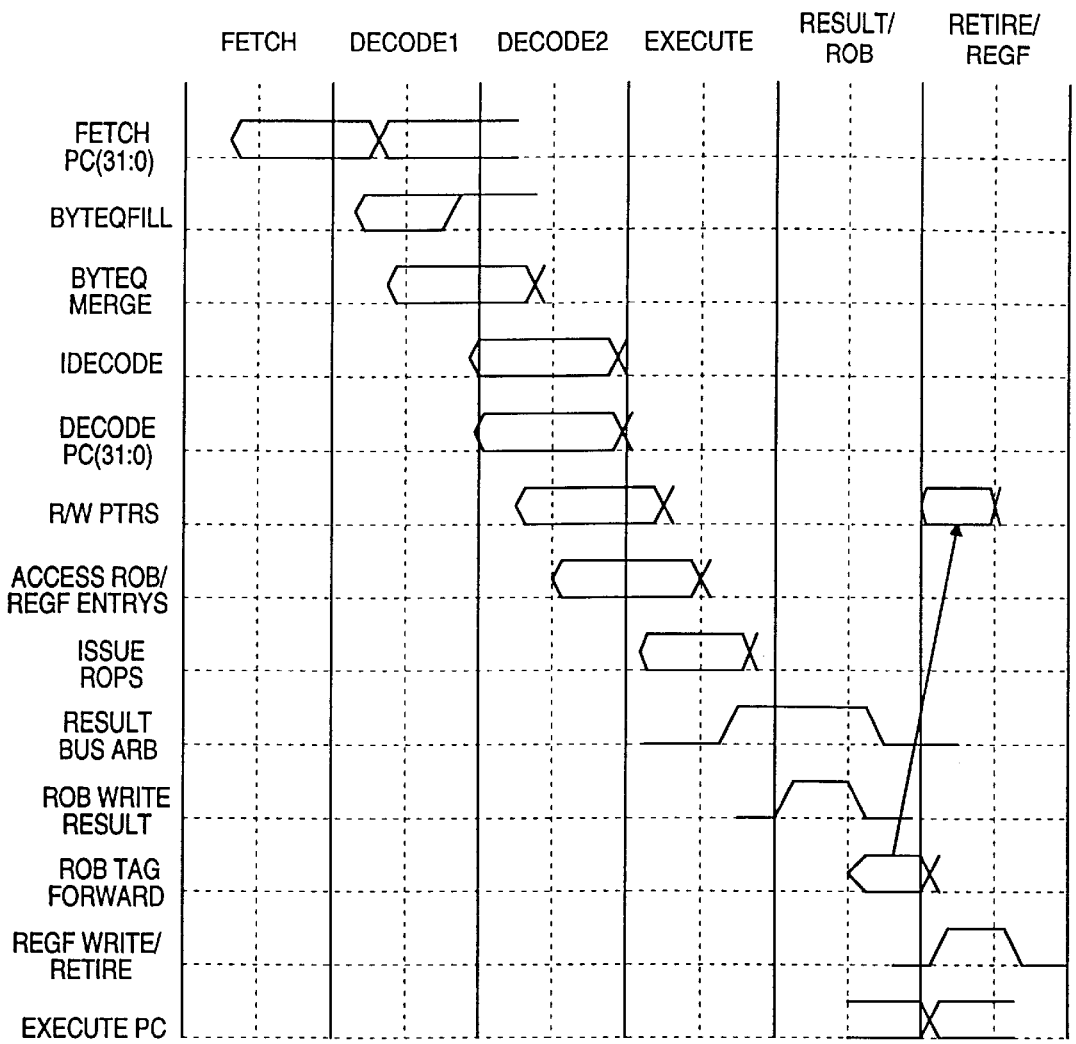
FIG. 8 is a timing diagram of the operation of the FIGS. 1A and 1B microprocessor in accordance with the present invention.

Referring to FIG. 8, the timing of processor 100 executing a sequential stream of x86 bytes is shown. In this example, the predicted executed path is actually taken and is available directly from instruction cache 104. During operation, there are five pipeline stages of effective execution of the microprocessor pipeline.

The fetch cycle is the first stage of execution. The fetch clock cycle is spent in instruction cache 104. Instruction cache 104 forms a new fetch program counter value during PH1 of the clock cycle and then accesses cache arrays 180, 182 in the PH2 of the fetch clock cycle. The fetch program counter value (FPC(31:0)) accesses the linear instruction cache tag arrays in parallel with the store arrays. Late in PH2 of the fetch cycle, a determination is made whether the linear tags match the fetch program counter linear address. If a match occurs, the predicted executed bytes are forwarded to byte queue 106.

In addition to accessing the tag and store arrays, the fetch program counter value also accesses branch prediction array 184 of instruction cache 104. Branch prediction array 184 identifies which of the x86 bytes are predicted executed, and whether the next block predicted executed is sequential or non-sequential. This information which is also accessed in PH2 of the fetch cycle, determines which of the bytes of the currently fetched block are driven as valid bytes into byte queue 106.

Additionally, during the fetch clock cycle, byte queue 106 may be holding X86 bytes that were previously fetched, but not yet issued to functional units. If so, then a byte filling position is indicted to instruction cache 104 to shift the first predicted byte of the present cycle over by an amount equal to the number of bytes that byte queue 106 is holding to fill the presently fetched bytes behind the held x86 bytes.

Because branch prediction information occurs in PH2 of the fetch cycle, the next block to be pre-fetched can either be sequential or non-sequential. In either case there is one clock cycle to access the arrays again. Thus, the branch prediction arrays allow a branch out of a block to have the same relative performance as accessing the next sequential block.

During the beginning of the first decode cycle, the bytes that were pre-fetched and predicted executed are driven to byte queue 106 at the designated fill position. This is shown in FIG. 8 as byte queue fill occurring in PH1 of the first decode cycle. These bytes are then merged with any pending bytes in byte queue 106.

Byte queue 106 contains the five bits of pre-decode state plus the raw x86 bytes to show where instruction boundaries arc. The head of the byte queue is always the beginning of the next predicted executed x86 instruction. In the middle of PH1 of the first decode stage, byte queue 106 merges the next stream of bytes from instruction cache 104 with the existing bytes in byte queue 106 and presents the merged stream of bytes of instruction decoder 108. Instruction decode 108 determines the number of ROPs each instruction takes and the position of the opcode and aligns these opcodes to the corresponding ROP issue positions 0 to 3 (0 being the next ROP to issue).

Instruction decode 108 maintains a decode program counter value for the ROP or ROPs corresponding to each of the x86 instructions in byte queue 108 by counting the number of bytes between instruction boundaries or detecting a branch within instruction cache 104 and attaching the program counter value to the first x86 byte fetched from that location. Using the opcode and ROP positioning information, as well as the immediate fields stored in byte queue 106, instruction decoder 108 statically determines the decode PC values during PH2 of the first decode cycle and PH1 of the second decode cycle. By the end of PH1 of the second decode cycle, all the register read and write pointers are resolved and the operation is determined. This is shown in FIG. 8 as the assertion of the read write pointer values.

Additionally, timing during PH1 of the second decode cycle is allocating reorder buffer entries for the corresponding ROPs that may issue in the next clock phase. Thus, up to four additional ROPs are each allocated one of the 16 entries in reorder buffer 114 during PH1. During PH2, the source read pointers for all the allocated ROPs are read from register file 112 while simultaneously accessing the queue of speculative ROPs in reorder buffer 114.

This simultaneous access of both arrays allows the late selection of whether to use the actual register file value or to forward either the operand or the tag from reorder buffer 114. By first allocating the four ROP entries in PH1 and then accessing reorder buffer 114 in PH2, read dependencies within the current ROPs being dispatched may be simultaneously examined with all previous ROPs that are still in a speculative state. This is shown in the timing diagram by the REGF/ROB access and the check on tags.

The execute cycle is analogous to the execute cycle on a standard scalar processor. ROPs are issued via dedicated opcode buses as well as the read operand buses discussed above. These operand buses can be seen on the timing diagram discharging in PH1 of the execute cycle. This is shown in the signals A/B read operand buses.

In late PH1 of the execute cycle, the functional units determine which ROPs have been issued to them, and whether they have any pending ROPs ready to issue from their local reservation stations. Within a functional unit's reservation station, a FIFO is always maintained to insure that the oldest instructions execute first. If an instruction is ready to execute within a functional unit, then the functional unit begins executing in late PH1 and continues to execute though PH2. This timing relates to ALU 122.

At the end of PH2, for all functional units of latency 1, the result is ready and the functional unit arbitrates for one of the five result buses. This is shown on the time diagram as the assertion of the Result Bus Arbitration signal. If access is granted in PH2 of the execute cycle, the functional unit that was granted access drives the allocated result bus in PH1 of the result cycle.

The result cycle is analogous to write on a RISC four-stage pipeline. The result cycle forwards values directly to other functional units for execution much like ALU forwarding in a RISC system. Microprocessor 100 includes both a result cycle and a retire cycle because of the speculative nature of the ROPs that are issuing, writing directly to the register file cannot occur until the instruction is the next instruction to retire. Reorder buffer 114 and result bus 140 forwarding make this cycle transparent to any executing program and no stall occurs for the overhead of writing to reorder buffer 114. In PH1 of the result cycle, the location of the speculative ROP in reorder buffer 114 is written with the destination result as well as any status. This entry in reorder buffer 114 is then set to indicate that the entry is valid as well as allocated. Accordingly, when this entry is requested, instead of forwarding a tag to a requested read access, reorder buffer 114 directly forwards the data.

In PH2 of the result cycle, the newly allocated tag can be detected by subsequent ROPs that require it to be one of its source operands. This is shown on the timing diagram as the direct forwarding of the result via a ROB tag forward onto the source A/B operand buses using the read and write pointers.

The retire cycle is the last stage of the pipeline. This is the cycle where the execute program counter value is stored in the execute program counter register. In PH1 of the retire cycle, the result of the operation is written to the register file and the execute program counter value in the execute program counter register is updated to point the next instruction to be retired. In PH1 of the retire cycle, the entry in reorder buffer 114 is de-allocated and is written from reorder buffer 114. Because the entry is de-allocated subsequent references to the result induce in a read from register file 112 rather than a speculative read from reorder buffer 114. Reads from register file 112 indicate the actual state of processor 100.

Accordingly, microprocessor 100 includes a five stage pipeline which uses a plurality of program counter values at different stages of the pipeline. Using these program counter values with such a pipeline allows microprocessor 100 to issue up to 4 simple x86 instructions per clock cycle.

OTHER EMBODIMENTS

Other embodiments are within the following claims.

Figure 9A:
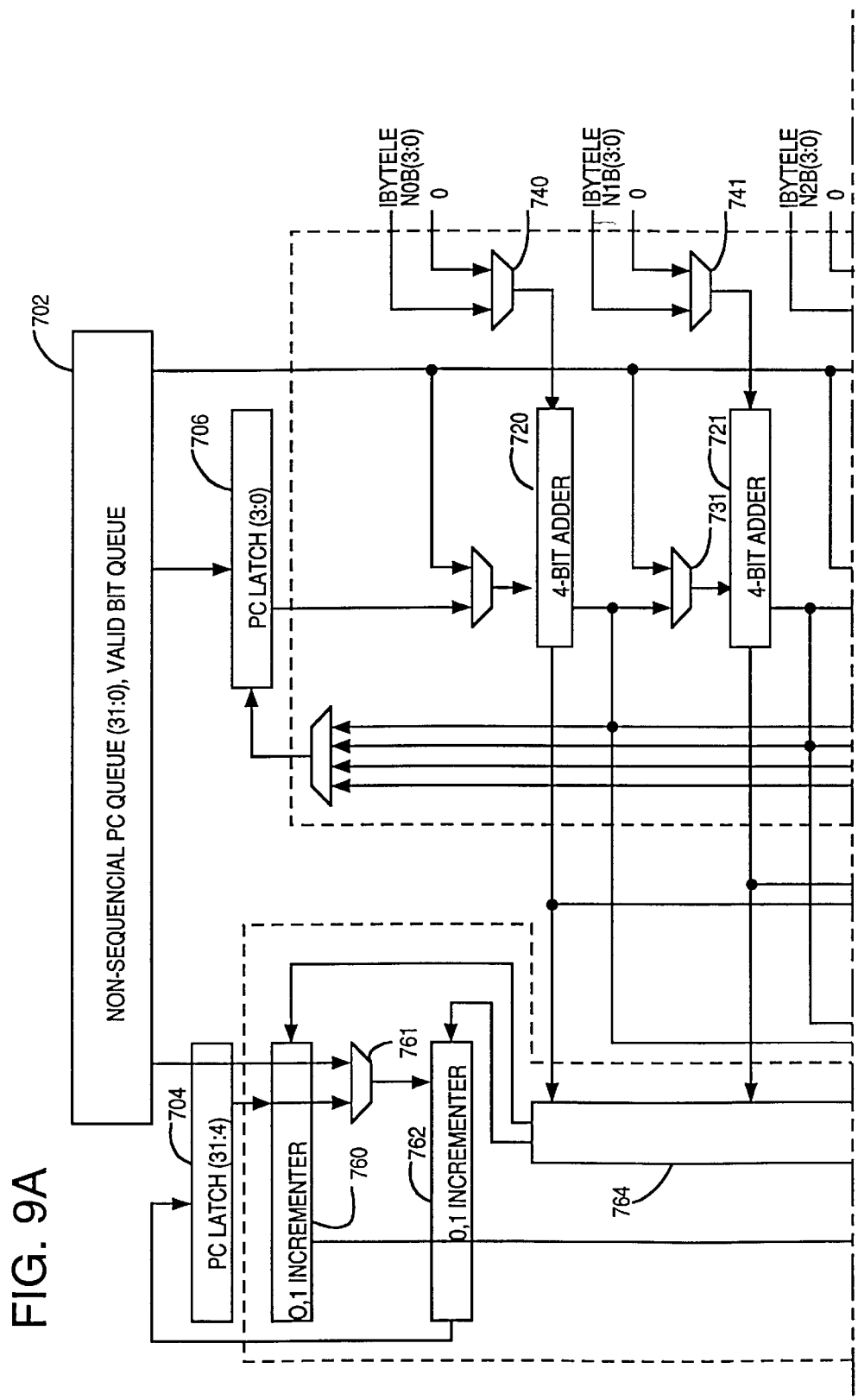

For example, referring to FIGS. 9A and 9B, other circuits may be used for generating the fetch program counter value as long as these circuits provide a less significant program counter value along with carry information. More specifically, alternate fetch program counter circuit 700, includes queue 702, more significant portion program counter latch 704, less significant portion program counter latch 706, more significant portion program counter generator circuit 708, less significant portion program counter generator circuit 710, and program counter value selector circuit 712.

Queue 702 holds the 32-bit non-sequential program counter value as well as the valid bit value and provides bits 4:31 of the non-sequential program counter value to more significant portion program counter generator circuit 708 and bits 0:3 of the non-sequential program counter value to less significant portion program counter generator circuit 710. The non-sequential program counter value is also provided to less significant portion program counter latch 706.

Less significant program counter latch provides bits 0:3 of the next program counter value to less significant program counter generator circuit 710. More significant program counter latch 704 provides bits 4:31 of the next program counter value to more significant program counter generator circuit 708. Less significant program counter generator circuit 710 provides carry bits to more significant program counter generator circuit 708 as well as program counter value selection circuit 712. More significant program counter generator circuit 712 provides bits 4:31 of the program counter value to program counter value selection circuit 712.

Less significant program counter generator circuit 710 includes adders 720–723, multiplexers 730–733 and multiplexers 740–743 as well as multiplexer 750. The combination of one of the adders 720–723, one of the multiplexers 730–733 and one of the multiplexers 740–743 provide the least significant four bits of a potential next decode program counter value. Each potential next decode program counter value corresponds to an ROP from queue 702. Multiplexers 730–733 provide one of the inputs to respective adders 720–723 based upon whether or not a previous decode PC value was a branch. Multiplexers 740–743 provide the other input to respective adders 720–723 based upon the byte length to the x86 instruction and to how many ROPs correspond to an x86 instruction. Each adder 720–723 provides the least significant four bits of a potential next decode PC value as well as a carry bit. The potential next decode PC values are provided to multiplexer 750, which provides one of these values as the next decode PC value, and to program counter value selection circuit 712, which provides these values to reorder buffer 114.

More significant program counter generator circuit 712 includes incrementer 760, multiplexer 761, incrementer 762 and carry selector 764. Incrementer 760 increments the more significant portion of the present decode PC value which is stored in PC latch 704 and provides this incremented value to multiplexer 761 which also receives the non-sequential PC value from queue 702. Multiplexer 761 provides one of these values to incrementer 762 based upon whether or not a branch was taken. Incrementer 762 receives this value and provides this value to PC latch 704. Increments 760 and 762 increment based upon the carry bit that is provided by carry selector 764. Carry selector 764 provides the carry bit of the last instruction to be dispatched to reorder buffer 114. Incrementor 760 provides bits 4:31 of the next decode PC value to branch section 135.

What is claimed is:

1. An apparatus for generating a program counter value comprising:

a first program counter circuit configured to generate a first program counter value, wherein
said first program counter value includes a more significant first program counter portion, a less significant first program counter portion and a carry signal for use in determining a next program counter value, and
said first program counter value represents a program counter value of a retrieved instruction; and an execute program counter circuit, wherein
said execute program counter circuit is coupled to receive said less significant first program counter portion and said carry signal from said first program counter circuit,
said execute program counter circuit is configured to generate an execute program counter value using said less significant first program counter portion and said carry signal, and
said execute program counter value represents a program counter value of an executed instruction.

2. A method for generating an execute program counter value, comprising:

generating, in a first program counter circuit, a more significant first program counter portion, a less significant first program counter portion and a carry signal for use in determining a next program counter value, wherein said more significant first program counter portion and said less significant first program counter portion represent a program counter value of a retrieved instruction;

providing said less significant first program counter portion and said carry signal to an execute program counter circuit; and causing said execute program counter circuit to generate said execute program counter value using said less significant first program counter portion and said carry signal.

3. The method as recited in claim 2, further comprising:

storing said less significant first program counter portion and said carry signal in a storage unit, wherein said first program counter circuit is coupled to provide said less significant first program counter portion and said carry signal to said storage unit, said storage unit is coupled to said execute program counter circuit, coupling said less significant first program counter portion and said carry signal from said storage unit to said execute program counter circuit, said first program counter circuit, said execute program counter circuit and said storage unit are included in a microprocessor, said microprocessor also includes an instruction pipeline, said storage unit corresponds to a stage of said instruction pipeline, and said storage unit is coupled to said first program counter circuit and said execute program counter circuit.

4. The method as recited in claim 2, further comprising:

generating said carry signal by adding an instruction length value to said less significant program counter portion.

* * * * *